(12) United States Patent
Duan et al.

(10) Patent No.: US 11,303,060 B2
(45) Date of Patent: Apr. 12, 2022

(54) ELECTRICAL CONNECTOR

(71) Applicant: Dongguan Luxshare Technologies Co., Ltd, Dongguan (CN)

(72) Inventors: BaiYu Duan, Dongguan (CN); Zhen Luo, Dongguan (CN); XiaoKai Wang, Dongguan (CN); XiaoPing Wu, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 56 days.

(21) Appl. No.: 17/036,664

(22) Filed: Sep. 29, 2020

(65) Prior Publication Data
US 2021/0098929 A1 Apr. 1, 2021

(30) Foreign Application Priority Data
Sep. 30, 2019 (CN) .......................... 201921658886.3

(51) Int. Cl.
*H01R 13/502* (2006.01)
*H01R 12/70* (2011.01)
(52) U.S. Cl.
CPC ........... *H01R 13/502* (2013.01); *H01R 12/70* (2013.01)
(58) Field of Classification Search
CPC ............................. H01R 13/502; H01R 12/70
See application file for complete search history.

(56) References Cited

U.S. PATENT DOCUMENTS

| 6,558,197 | B1 * | 5/2003 | Chen | H01R 13/6272 439/607.21 |
|---|---|---|---|---|
| 7,491,074 | B1 * | 2/2009 | Lai | G06K 7/0021 439/159 |
| 2003/0194900 | A1 * | 10/2003 | Lee | H01R 13/6275 439/358 |
| 2008/0305669 | A1 * | 12/2008 | Hong | H01R 13/701 439/329 |
| 2012/0033380 | A1 * | 2/2012 | Sun | H05K 7/20727 361/695 |
| 2017/0187157 | A1 * | 6/2017 | Hsu | H01R 12/7005 |
| 2021/0098929 | A1 * | 4/2021 | Duan | H01R 13/502 |

* cited by examiner

*Primary Examiner* — Abdullah A Riyami
*Assistant Examiner* — Nader J Alhawamdeh
(74) *Attorney, Agent, or Firm* — Birch, Stewart, Kolasch & Birch, LLP (57) ABSTRACT

An electrical connector comprises: an electrical connector housing; a light-guiding component disposed on a sidewall of the electrical connector housing; a secure-connecting structure disposed between the sidewall of the electrical connector housing and the light-guiding component to secure the light-guiding component to the sidewall of the electrical connector housing. The secure-connecting structure comprises a first securing component and a second securing component. The first securing component comprises at least one securing hole comprising an insertion hole and a retaining hole. The insertion hole communicates with the retaining hole. The second securing component comprises a securing protrusions comprising a first securing part and a second securing part disposed on the first securing parts. While disposing the second securing component into the first securing component, the second securing part passes through the insertion hole and then the first securing part moves into the retaining hole from the insertion hole.

18 Claims, 12 Drawing Sheets

ELECTRICAL CONNECTOR

CROSS REFERENCE TO RELATED APPLICATION

This application claims the priority benefit of Chinese Patent Application Serial Number 201921658886.3, filed on Sep. 30, 2019, the full disclosure of which is incorporated herein by reference.

BACKGROUND

Technical Field

The present disclosure relates to the technical field of electrical connector, and more particularly to an electrical connector comprising light-guiding component.

Related Art

The conventional electronic products comprising electrical connectors are usually equipped with a luminous component displaying the operating status of the electrical connector on the circuit board of the electrical connector, so light-guiding tubes are provided around the electrical connector. The light-guiding tube comprises a light input end and a light output end. The light input end corresponds to the luminous component on the circuit board, and the light output end faces the outside of the electronic product. In this way, the user could observe the state of use of the electrical connector from the outside of the electronic product. However, the fixation of the securing component between the light-guiding tube and the electrical connector is often loosened, which causes the light-guiding tube easily fall off from the electrical connector. This is not convenient for use.

The embodiments of the present disclosure provide an electrical connector intended to solve the issue that the securing component between the light-guiding tube and the electrical connector is often loosened, which causes the light-guiding tube to easily fall off from the electrical connector.

The present disclosure provides an electrical connector comprising: an electrical connector housing having a sidewall; a light-guiding component disposed on the sidewall of the electrical connector housing; a secure-connecting structure disposed between the sidewall of the electrical connector housing and light-guiding component to secure the light-guiding component to the sidewall of the electrical connector housing; the secure-connecting structure comprises a first securing component and a second securing component; the first securing component comprises at least one securing hole; each securing hole comprises an insertion hole and a retaining hole; the insertion hole is in communication with the retaining hole; the second securing component comprises a securing protrusion; the securing protrusion comprises a first securing part and a second securing part disposed on the first securing part; when the second securing component is disposed into the first securing components, the second securing part first passes through the insertion hole and then the first securing part moves into the retaining hole from the insertion hole.

The embodiments of the present disclosure could stably secure the second securing component onto the first securing component and therefore eliminate the issue of loosening by connecting the first securing component comprising the insertion hole and the retaining hole and the second securing component comprising the first securing part and the second securing part to secure the light-guiding component onto the electrical connector housing. It can also effectively prevent the light-guiding component from falling off from the electrical connector housing.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only include these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the invention.

In the following embodiments, the same or similar elements will be indicated by the same reference numerals.

Figure 1:
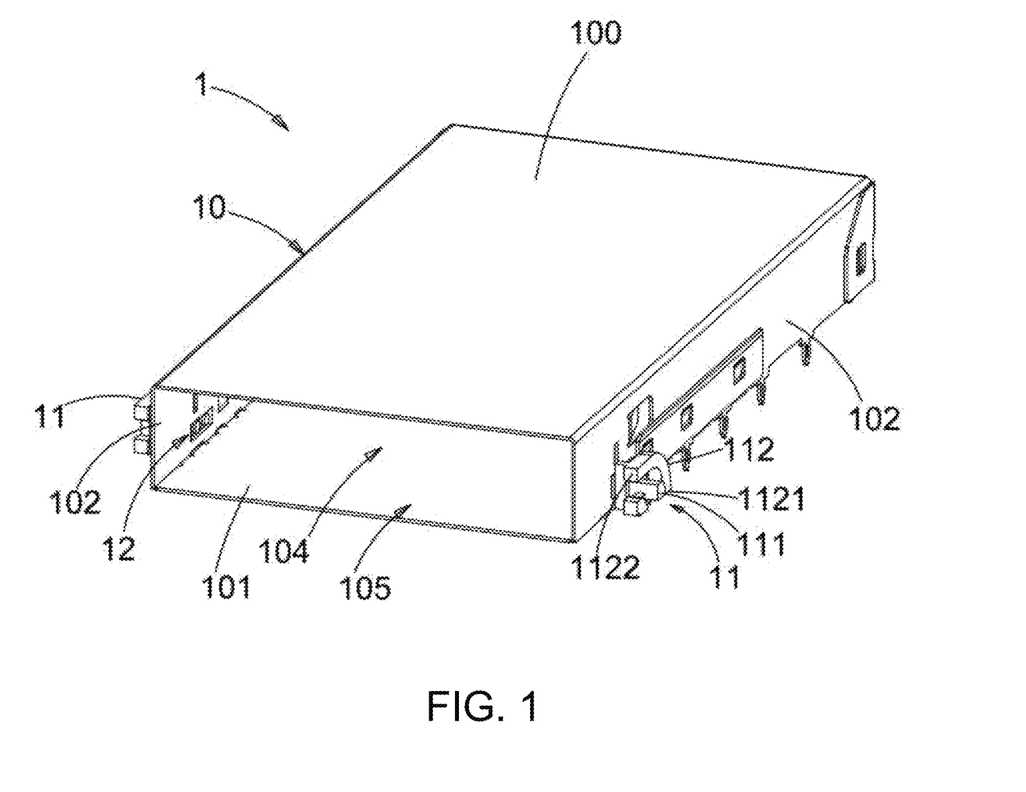
FIG. 1 is a perspective view of an electrical connector of the first embodiment of the present disclosure.
Figure 2:
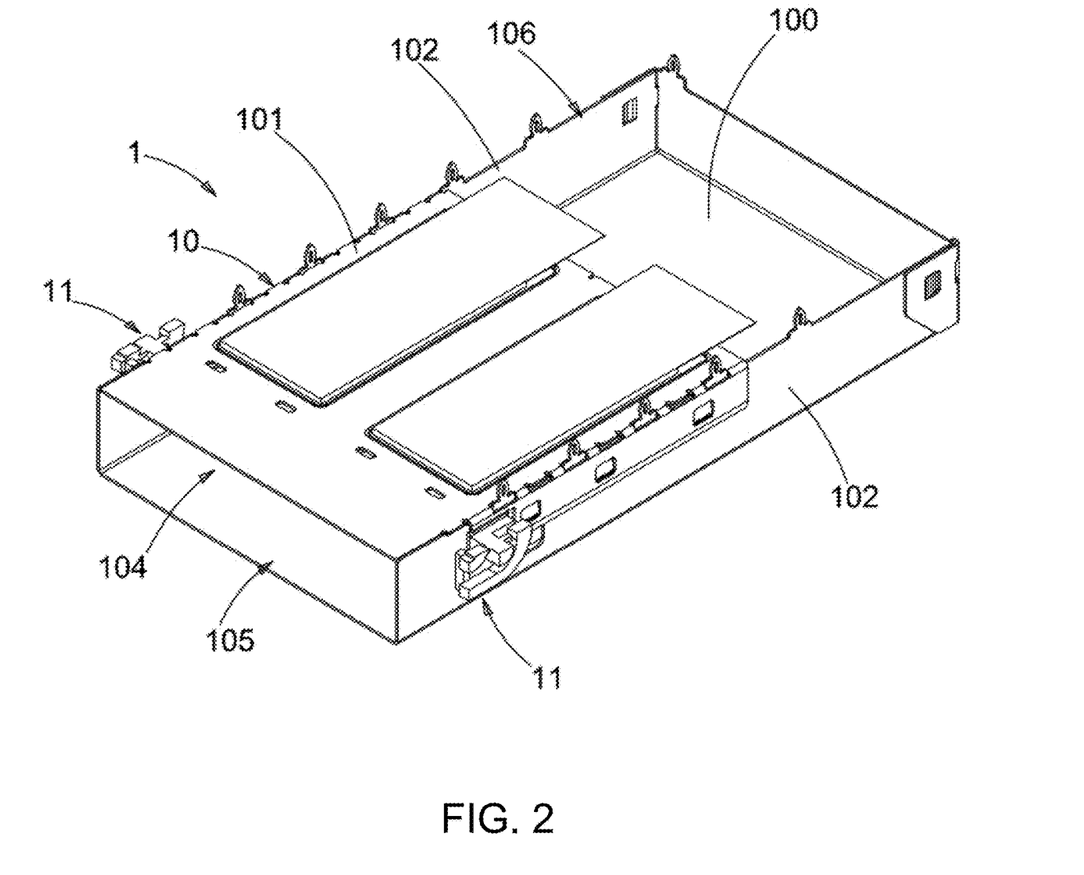
FIG. 2 is another perspective view of an electrical connector of the first embodiment of the present disclosure.

FIG. 1 and FIG. 2 are perspective views of an electrical connector of the first embodiment of the present disclosure. The electrical connector 1 of the present embodiment comprises an electrical connector body (not shown), an electrical connector housing 10, a light-guiding component 11, and a secure-connecting structure 12. The electrical connector housing 10 comprises an upper surface 100, a lower surface 101 opposite to the upper surface 100, two opposite sidewalls 102, an accommodating space 104, a first opening 105, and a second opening 106. The accommodating space 104 is formed between the upper surface 100, the lower surface 101, and the two sidewalls 102. The first opening 105 is disposed among one end of the upper surface 100, the lower surface 101, and the two sidewalls 102. The second opening 106 is disposed on the lower surface 101 and is away from the first opening 105. It means that one end of the electrical connector housing 10 opposite to the first opening 105 is closed. The electrical connector body is disposed in the accommodating space 104 of the electrical connector housing 10. The interface end of the electrical connector body corresponds to the first opening 105. The electrical connecting end of the electrical connector body corresponds to the second opening 106. In this embodiment, the electrical connector 1 is a horizontal type electrical connector, so the second opening 106 is disposed on the lower surface 101 of the electrical connector housing 10. The electrical connector 1 could be a vertical type electrical connector, and therefore the second opening 106 could be disposed on one end of the electrical connector housing 10 opposite to the first opening 105.

Figure 3:
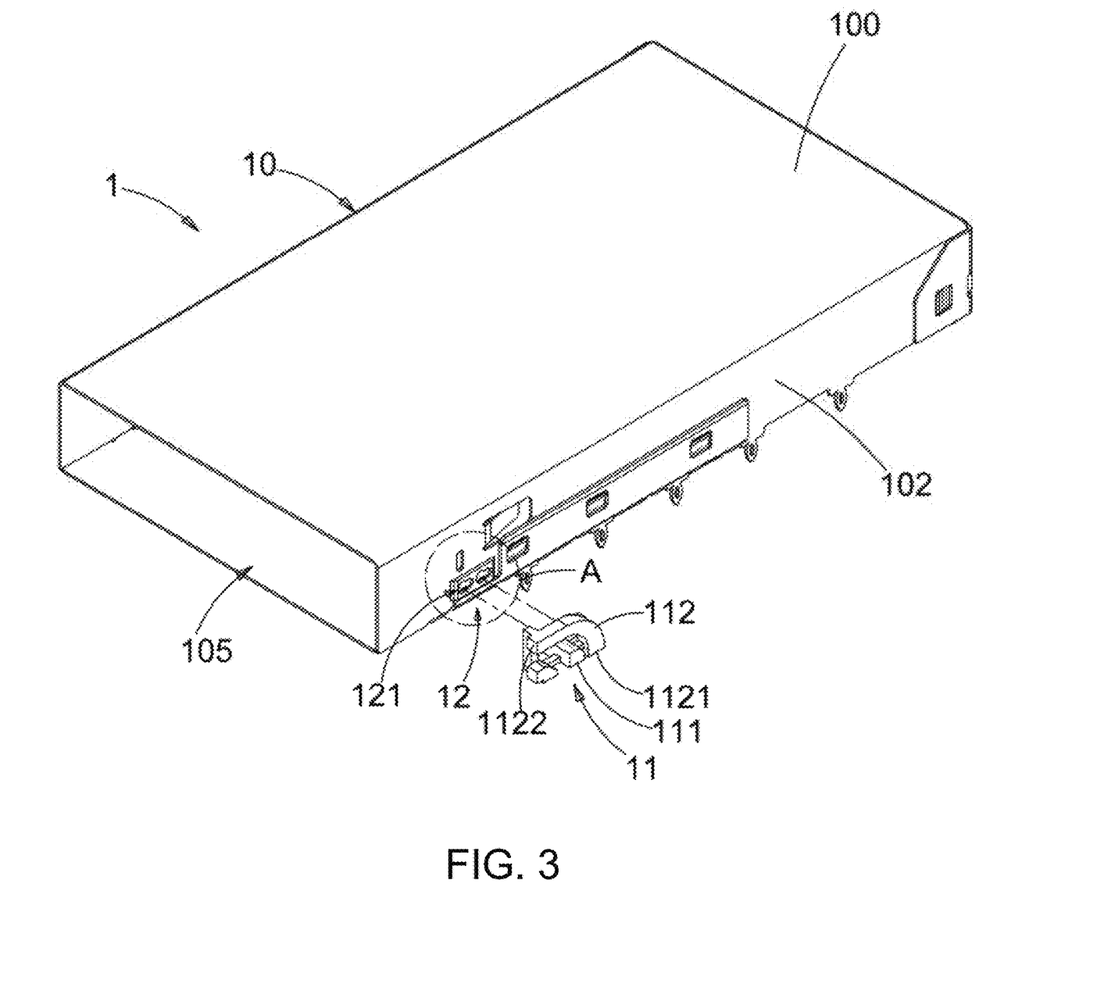
FIG. 3 is an exploded view of an electrical connector of the first embodiment of the present disclosure.
Figure 4:
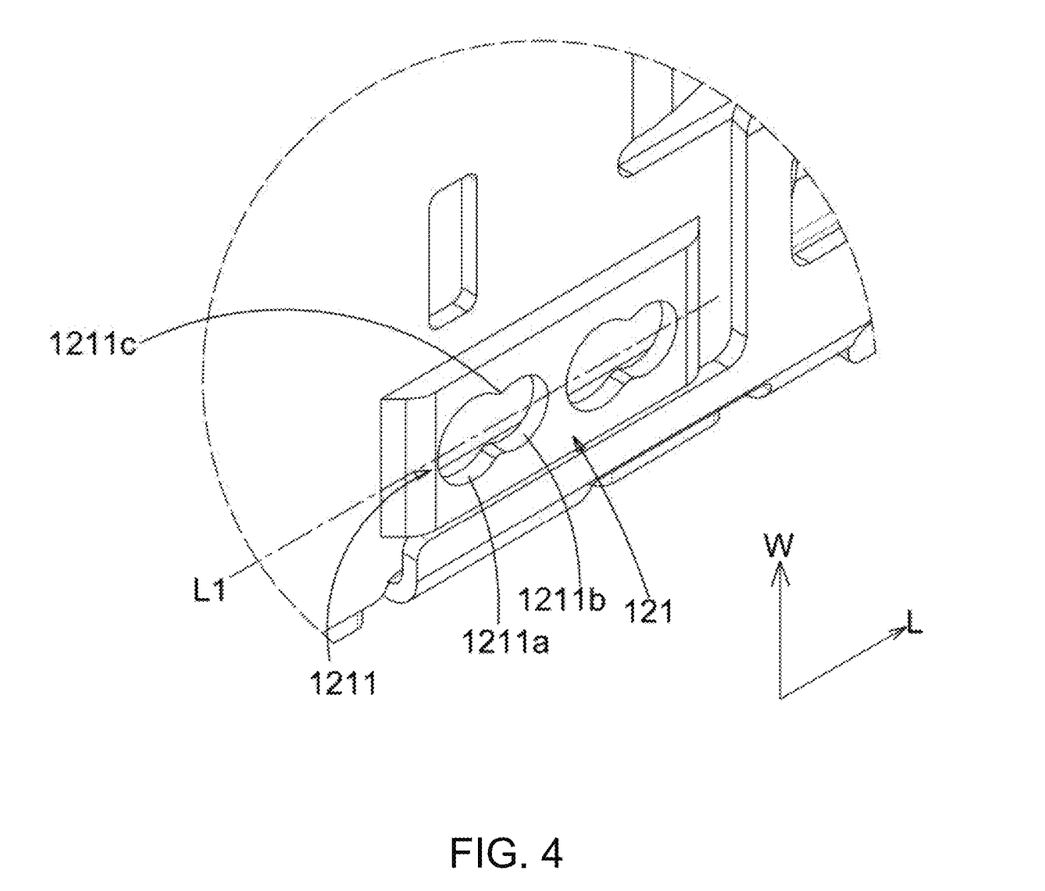
FIG. 4 is an enlarged view of area A of FIG. 3.
Figure 5:
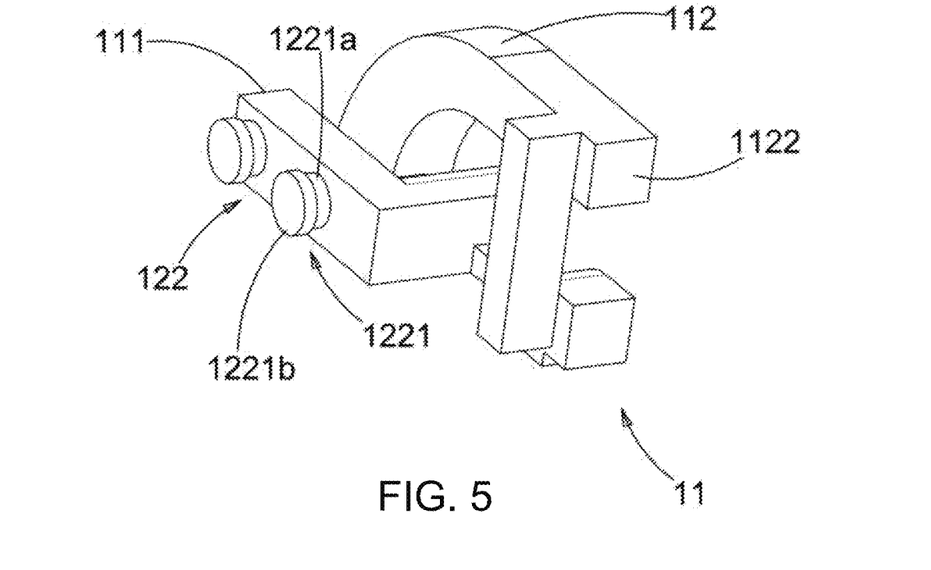
FIG. 5 is a perspective view of a light-guiding component of the first embodiment of the present disclosure.

Please refer to FIG. 3 to FIG. 5. FIG. 3 is an exploded view of an electrical connector of the first embodiment of the present disclosure. FIG. 4 is an enlarged view of area A of FIG. 3. FIG. 5 is a perspective view of a light-guiding component of the first embodiment of the present disclosure. As shown in the figures, the light-guiding component 11 is disposed on the sidewall 102 of the electrical connector housing 10. In this embodiment, the light-guiding component 11 is disposed on the corresponding sidewall 102 by a secure-connecting structure 12. That is, the secure-connecting structure 12 is disposed between the sidewall 102 of the electrical connector housing 10 and the light-guiding component 11 to secure the light-guiding component 11 onto the sidewall 102 of the electrical connector housing 10. The secure-connecting structure 12 comprises a first securing component 121 and a second securing component 122. The first securing component 121 comprises securing holes 1211. Each securing hole 1211 comprises an insertion hole 1211a and a retaining hole 1211b. The insertion hole 1211a is in communication with the retaining hole 1211b. In this embodiment, the insertion hole 1211a and the retaining hole 1211b partially overlap to realize the communication between the insertion hole 1211a and the retaining hole 1211b. An interference gap 1211c exists between the insertion hole 1211a and the retaining hole 1211b. The interference gap 1211c is the position where the retaining hole 1211b communicates with the insertion hole 1211a. The diameter or width of the insertion hole 1211a is greater than those of the retaining hole 1211b. The direction of line L1 that the center of the insertion hole 1211a connects to the center of the retaining hole 1211b is parallel to the direction of the length of the electrical connector housing 10. That is, the insertion holes 1211a and the retaining holes 1211b are arranged laterally along the length direction of the electrical connector housing 10.

The second securing component 122 comprises securing protrusions 1221. Each securing protrusion 1221 comprises a first securing part 1221a and a second securing part 1221b. The second securing part 1221b is connected to the first securing part 1221a. The second securing part 1221b is disposed on the first securing part 1221a. The maximum outer diameter or maximum width of the first securing part 1221a is less than the maximum outer diameter or maximum width of the second securing part 1221b. The maximum outer diameter or maximum width of the first securing part 1221a is less than or equal to the diameter or width of the retaining hole 1211b. The maximum outer diameter or maximum width of the second securing part 1221b is greater than the diameter or width of the retaining hole 1211b and is less than the diameter or width of the insertion hole 1211a.

In this embodiment, the insertion holes 1211a and the retaining holes 1211b a circular. In some embodiments, at least one of the insertion hole 1211a and the retaining hole 1211b could be square-shaped, polygon-shaped or other geometric shapes. The first securing part 1221a and the second securing part 1221b are cylindrical. It is preferable that if the cross-sectional shape of the first securing part 1221a and the second securing part 1221b correspond to the shape of the insertion holes 1211a and the retaining holes 1211b. In some embodiments, the cross-sectional shape of the first securing part 1221a and the second securing part 1221b may not correspond to the shape of the insertion holes 1211a and the retaining holes 1211b. In some embodiments, at least one of the insertion hole 1211a and the retaining hole 1211b could be square-shaped, polygon-shaped or other geometric shapes. In some embodiments, one of the first securing part 1221a and the second securing part 1221b could be a prism, for example, a triangular prism, a tetragon prism, or a pentagon prism. In some embodiments, the second securing part 1221b can be a circular table, a cone or a pyramid as long as the maximum outer diameter or maximum width of the second securing part 1221b is greater than the maximum outer diameter or maximum width of the first securing part 1221a and is less than the diameter or width of the insertion hole 1211a. The maximum outer diameter of the first securing part 1221a or the second securing part 1221b refers to the maximum diameter of the circular cross-sectional area of the first securing part 1221a or the second securing part 1221b while the first securing part 1221a is a cylinder or the second securing part 1221b is a cylinder, a circular table, or a cone.

In this embodiment, the first securing component 121 is disposed on the sidewall 102 of the electrical connector housing 10. The first securing part 1221 of the second securing component 122 is disposed on a surface of the light-guiding component 11 facing the electrical connector housing 10. The second securing part 1221b is away from the light-guiding component 11.

Figure 6:
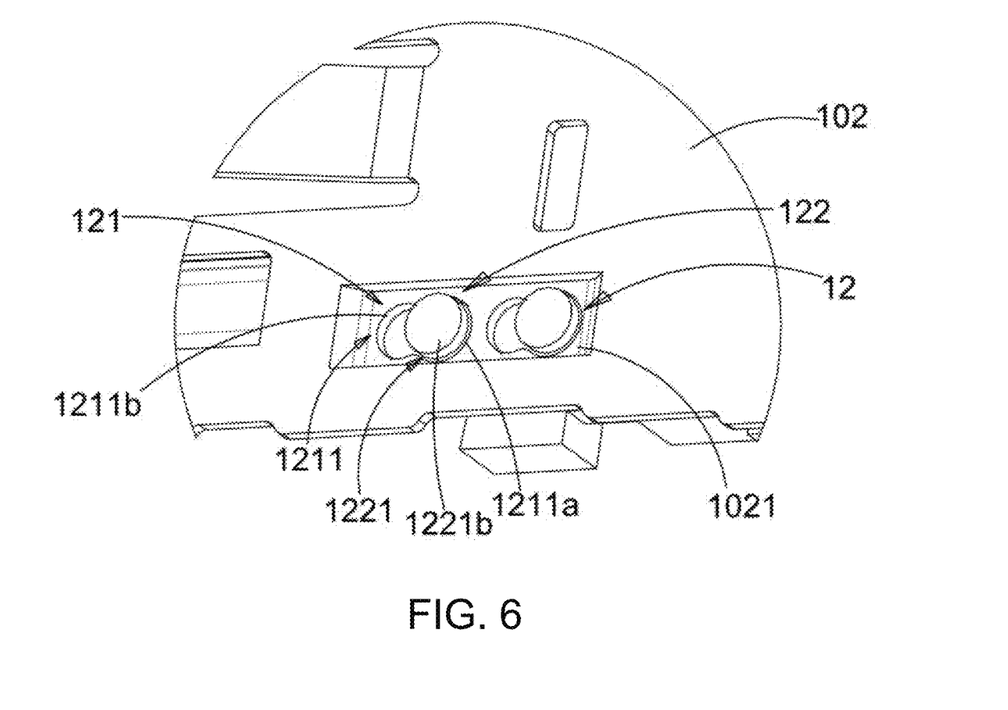
FIG. 6 is a state diagram of use of the connection between the first securing component and the second securing component of the first embodiment of the present disclosure.
Figure 7:
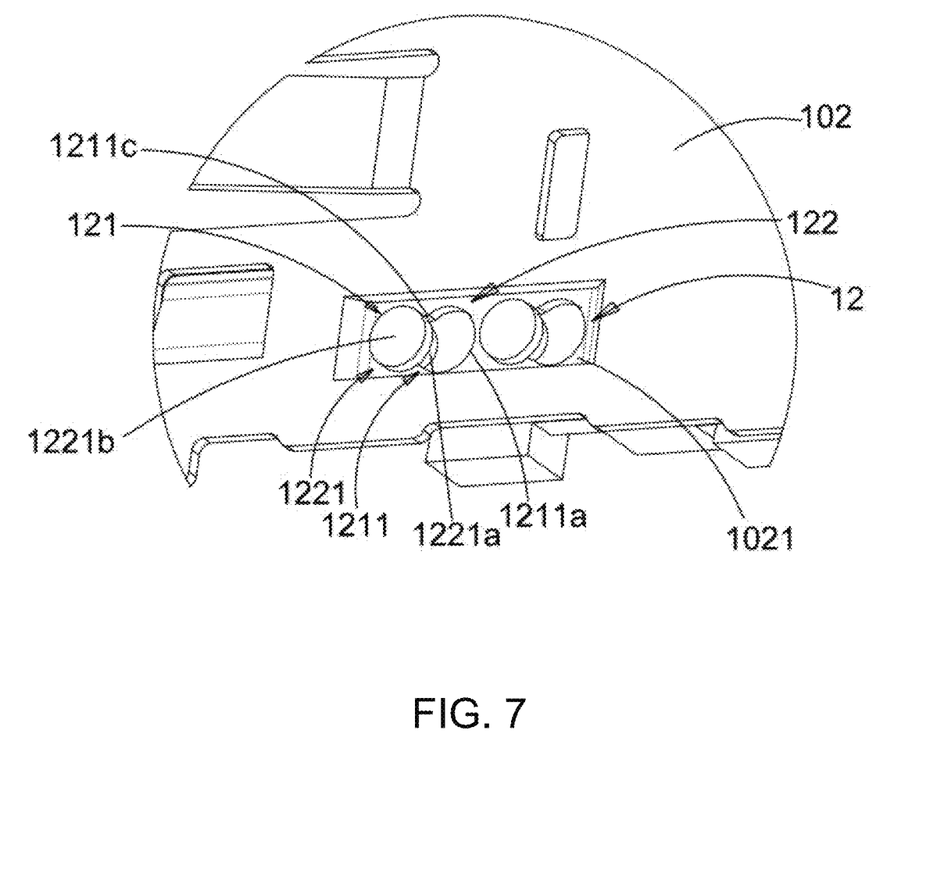
FIG. 7 is another state diagram of use of the connection between the first securing component and the second securing component of the first embodiment of the present disclosure.

Please refer to FIG. 6 and FIG. 7. FIG. 6 is a state diagram of use of the connection between the first securing component and the second securing component of the first embodiment of the present disclosure. FIG. 7 is another state diagram of use of the connection between the first securing component and the second securing component of the first embodiment of the present disclosure. As shown in the figures, the securing protrusions 1221 of the second securing component 122 are disposed in the corresponding securing holes 1211 while disposing the second securing component 122 in the first securing component 121 to secure the light-guiding component 11 onto the sidewall 102 of the electrical connector housing 10. To dispose the securing protrusions 1221 of the second securing component 122 in the corresponding securing holes 1211, firstly pass the second securing parts 1221b of the securing protrusions 1221 through the insertion holes 1211a, making the second securing parts 1221b entering the electrical connector housing 10, and having the first securing parts 1221a staying in the insertion holes 1211a. Then, the first securing parts 1221a move to the retaining holes 1211b from the insertion holes 1211a. In this embodiment, the maximum outer diameter or maximum width of the first securing part 1221a is equal to the diameter or width of the retaining hole 1211b. The first securing parts 1221a are secured in the retaining hole 1211b by an interference fit. In this way, the second securing component 122 can be stably secured to the first securing component 121, which eliminates the issue of loosening. Moreover, the light-guiding component 11 can be effectively prevented from falling off from the electrical connector housing 10.

Because the maximum outer diameter or maximum width of the second securing part 1221b is greater than the diameter or width of the retaining hole 1211b, the second securing part 1221b cannot penetrate through the retaining hole 1211b, so that the light-guiding component 11 can be prevented from disengaging the electrical connector housing 10 in a direction perpendicular to the sidewall 102 of the electrical connector housing 10. In addition, since the first securing part 1221a enters the retaining hole 1211b through the interference gap 1211c, and the width of the interference gap 1211c is less than or equal to the maximum outer diameter or the maximum width of the first securing part 1221a, making the first securing part 1221a to interfere with the sidewall of the interference gap 1211c, the first securing part 1221a could not move back into the insertion hole 1211a through the interference gap 1211c, so as to prevent the light-guiding component 11 from detaching the electrical connector housing 10. Therefore, the light-guiding component 11 could be stably secured onto the electrical connector housing 10 by the secure-connecting structure 12 of this embodiment, so that the light-guiding component 11 is not easily loosened.

Figure 8:
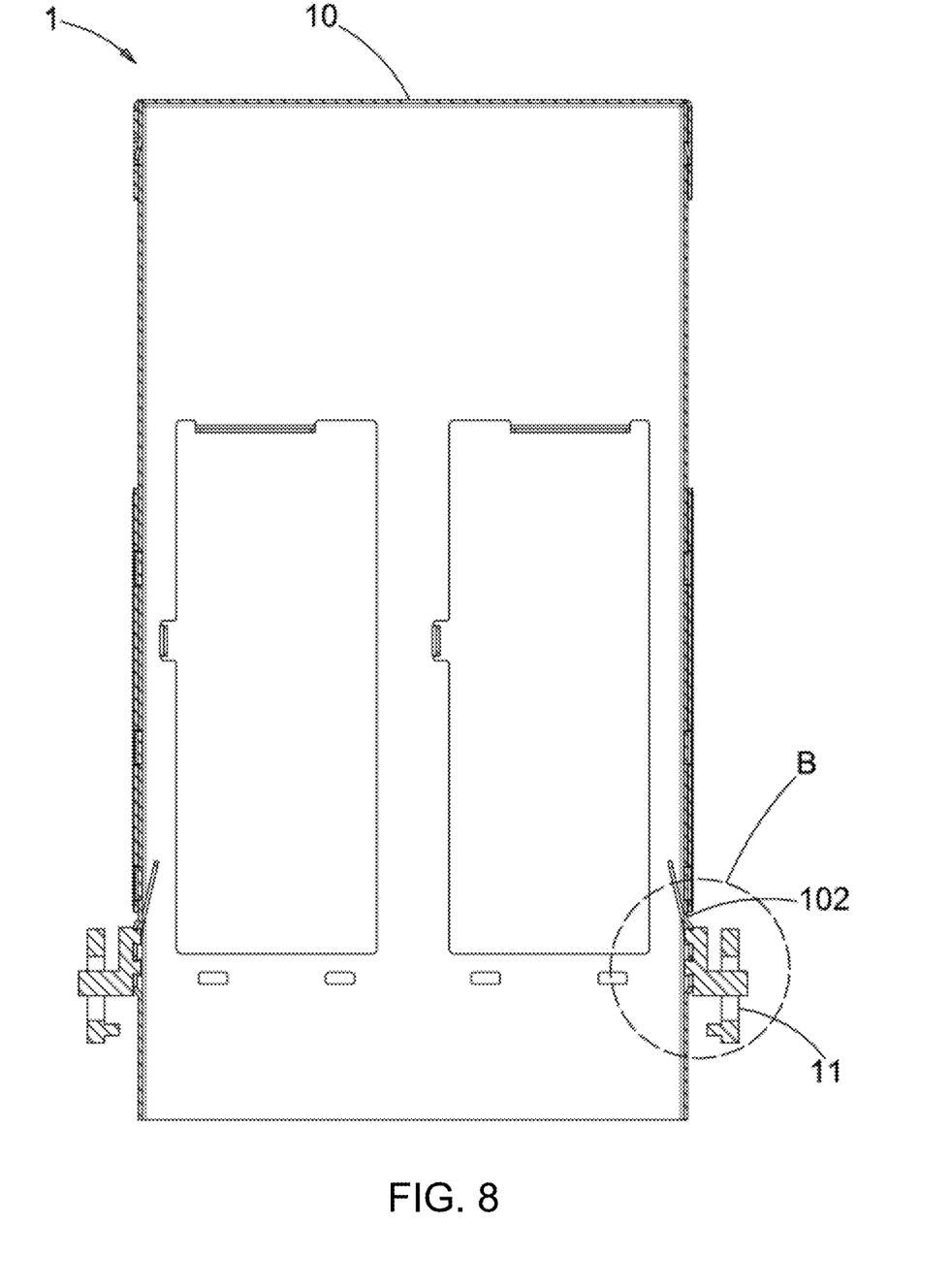
FIG. 8 is a cross-sectional view of an electrical connector of the first embodiment of the present disclosure.
Figure 9:
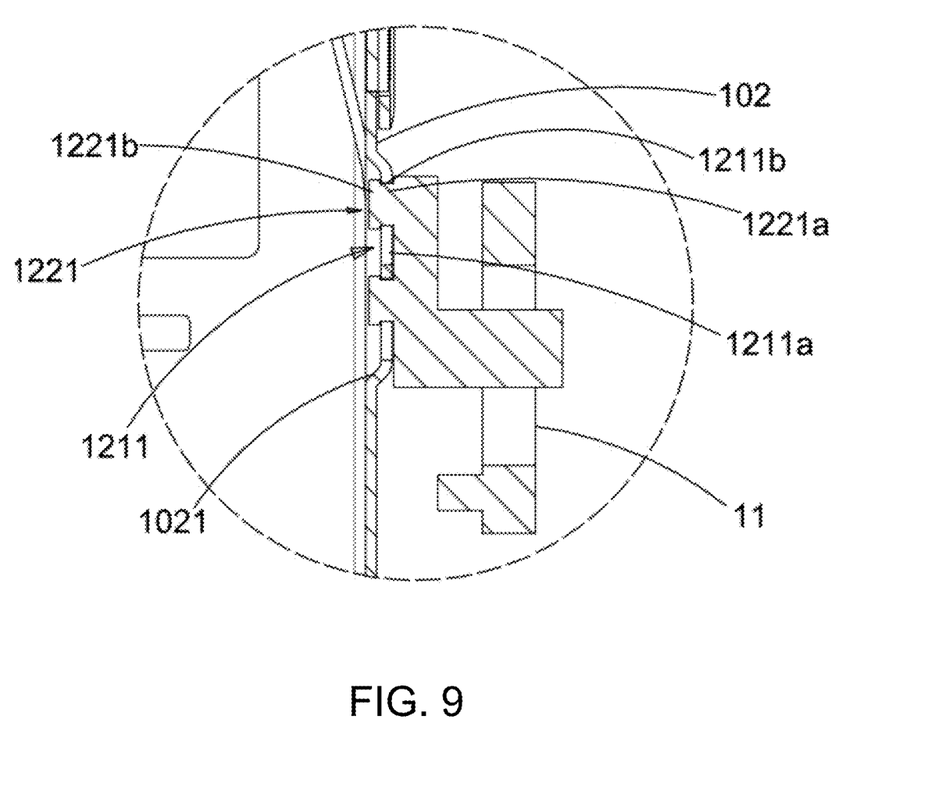
FIG. 9 is an enlarged view of area B of FIG. 8.

Please refer to FIG. 8 and FIG. 9, which are a cross-sectional view of an electrical connector of the first embodiment of the present disclosure and an enlarged view of area B of FIG. 8, respectively. As shown in the figures, in this embodiment, the height of the first securing part 1221a is equal to the depth of the securing hole 1211 of the first securing component 121. In this embodiment, the gap between the contact surface that the second securing part 1221b is in contact with the first securing part 1221a and the contact surface that the light-guiding component 11 is in contact with the first securing part 1221a is equal to the depth of the securing hole 1211 of the first securing component 121. The contact surface that the second securing part 1221b is in contact with the first securing part 1221a and the contact surface that the light-guiding component 11 is in contact with the first securing part 1221a abut against with the opposite surfaces of the sidewall 102 of the electrical connector housing 10 at the periphery of the securing hole 1211, respectively, while the first securing part 1221a is disposed in the retaining hole 1211b. In this way, frictional resistance is generated among the second securing part 1221b, the light-guiding component 11 and the sidewall 102 of the electrical connector housing 10, preventing the first securing part 1221a from moving toward the insertion hole 1211a.

Referring to FIG. 6, FIG. 7 and FIG. 9 again, in this embodiment, a recess 1021 is provided on the inner surface of the sidewall 102 of the electrical connector housing 10. The first securing component 121 is disposed at the bottom of the recess 1021. The second securing component 122 would be in the recess 1021 while the second securing component 122 is disposed into the first securing component 121. In this embodiment, the securing protrusion 1221 of the second securing component 122 passes through the securing hole 1211 of the first securing component 121. At this time, the second securing part 1221b is in the recess 1021. Thus, the second securing part 1221b would not enter the accommodating space 104. In this way the second securing part 1221b would not affect the arrangement of the electrical connector body, and the volume of the electrical connector housing 10 can be effectively reduced.

Referring to FIG. 1, FIG. 3 and FIG. 5 again, the light-guiding component 11 of this embodiment comprises a securing base 111 and a light-guiding tube 112 disposed on the securing base 111. The second securing component 122 is disposed on a surface of the securing base 111 facing the electrical connector housing 10. That is, the first securing part 1221a of the securing protrusion 1221 is disposed on a surface of the securing base 111 facing the electrical connector housing 10. The second securing part 1221b is away from the surface of the securing base 111 facing the electrical connector housing 10. The light-guiding tube 112 comprises a light input end 1121 and a light output end 1122. The end face of the light input end 1121 is close to the lower surface 101 having a second opening 106. The end face of the light output end 1122 is on one side of the first opening 105. While the electrical connector 1 of this embodiment is disposed on a circuit board (not shown), the light input end 1121 of the light-guiding tube 112 corresponds to a luminous component of the circuit board. The light from the luminous component enters the light-guiding tube 112 from the light input end 1121. The light is transmitted to the light output end 1122 through the light-guiding tube 112, and then the light is emitted from the light output end 1122.

In this embodiment, there are two securing holes 1211 of the first securing component 121. The number of the securing protrusions 1221 of the second securing component 122 corresponds to the number of the securing holes 1211 of the first securing component 121. Therefore, the number of securing protrusions 1221 of the second securing component 122 is also two. In some embodiments, the number of the securing protrusions 1221 of the second securing component 122 may not correspond to the number of the securing holes 1211 of the first securing component 121, but the number of securing protrusions 1221 needs to be less than that of securing holes 1211. In addition, the number of the securing holes 1211 of the first securing component 121 and the number of the securing protrusions 1221 of the second securing component 122 may be one or more than one, which should not be limited to this embodiment.

In this embodiment, there are two light-guiding components 11 respectively disposed on the sidewalls 102 of the electrical connector housing 10. Therefore, there are two secure-connecting structures 12 respectively secure the light-guiding components 11 onto the sidewalls 102. In some embodiments, the number of the light-guiding components 11 may also be one, and the number of the secure-connecting structures 12 corresponds to the number of the light-guiding components 11. The number of the light-guiding tubes 112 of each light-guiding component 11 is at least one. The end surface of the light input end 1121 of each light-guiding tube 112 is close to the lower surface 101 having a second opening 106. The end face of the light output end 1122 is on one side of the first opening 105.

The first securing component 121 of this embodiment is disposed on a sidewall 102 of the electrical connector housing 10, and the second securing component 122 is disposed on the light-guiding component 11. In some embodiments, the first securing component 121 may also be disposed on the light-guiding component 11, and the second securing component 122 may be disposed on a sidewall 102 of the electrical connector housing 10, and this would not be repeated herein.

Figure 10:
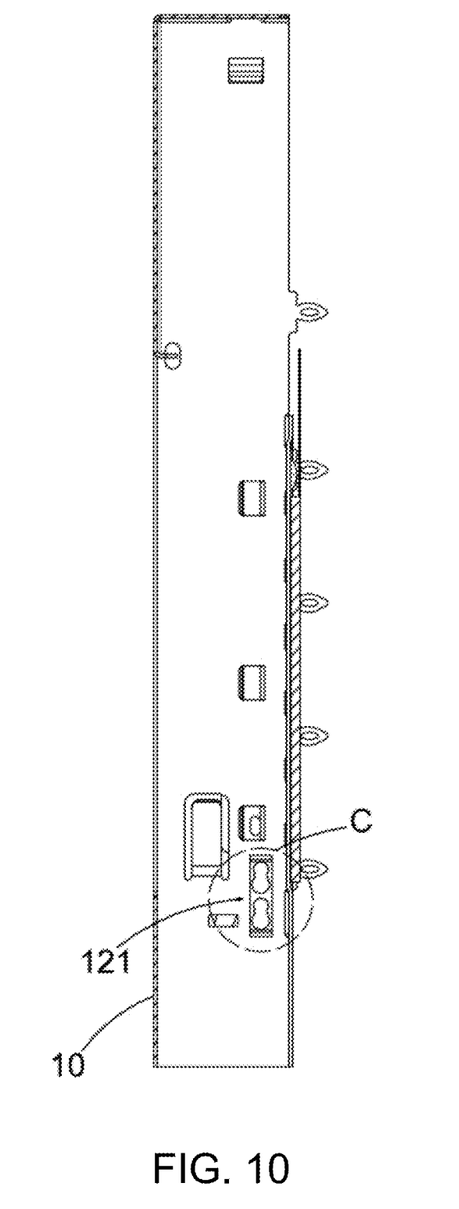
FIG. 10 is a cross-sectional view of the electrical connector housing of the second embodiment of the present disclosure.
Figure 11:
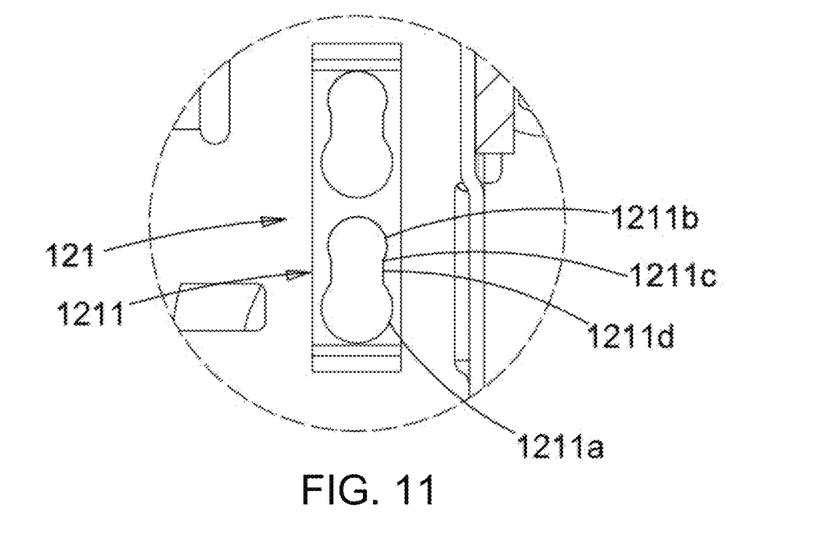
FIG. 11 is an enlarged view of area C of FIG. 10.

Please refer to FIG. 10 and FIG. 11. FIG. 10 is a cross-sectional view of the electrical connector housing of the second embodiment of the present disclosure. FIG. 11 is an enlarged view of area C of FIG. 10. As shown in the figures, in this embodiment, the electrical connector 1 is different from that of the first embodiment in that the insertion holes 1211a of securing holes 1211 of a first securing component 121 of this embodiment do not overlap with the retaining holes 1211b. The securing hole 1211 further comprises a communication hole 1211d. Two ends of the communication hole 1211d are respectively connected to the insertion hole 1211a and the retaining hole 1211b so that the insertion hole 1211a could communicate with the retaining hole 1211b. One end of the communication hole 1211d that the communication hole 1211d communicates with the retaining hole 1211b is an interference gap 1211c. The width of the interference gap 1211c is less than or equal to the maximum outer diameter or the maximum width of the first securing part of the securing protrusion. The maximum outer diameter or the maximum width of the first securing part of the securing protrusion is less than or equal to the diameter or width of the retaining hole 1211b. The first securing part of the securing protrusion enters the retaining hole 1211b through the communication hole 1211d.

Figure 12:
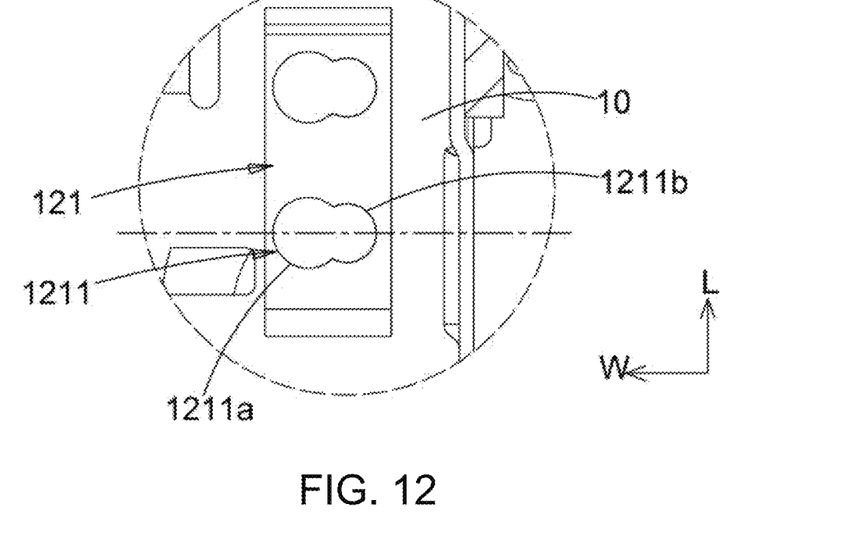
FIG. 12 is a schematic diagram of the first securing component of the third embodiment of the present disclosure.

Please refer to FIG. 12. FIG. 12 is a schematic diagram of the first securing component of the third embodiment of the present disclosure. As shown in the figure, the electrical connector 1 of this embodiment is different from that of the first embodiment in that the direction that the center of the insertion hole 1211a connects to the center of the retaining hole 1211b of the first embodiment is parallel to the length direction L of the electrical connector housing 10. In this embodiment, the direction that the center of the insertion hole 1211a connects to the center of the retaining hole 1211b is perpendicular to the length direction L of the electrical connector housing 10. This indicates that the insertion holes 1211a and the retaining holes 1211b are arranged longitudinally along the width direction W of the electrical connector housing 10. In some embodiments, the direction that the center of the insertion hole 1211a connects to the center of the retaining hole 1211b may also be inclined with the length direction L of the electrical connector housing 10. This indicates that the insertion hole 1211a and the retaining hole 1211b are arranged obliquely.

Figure 13:
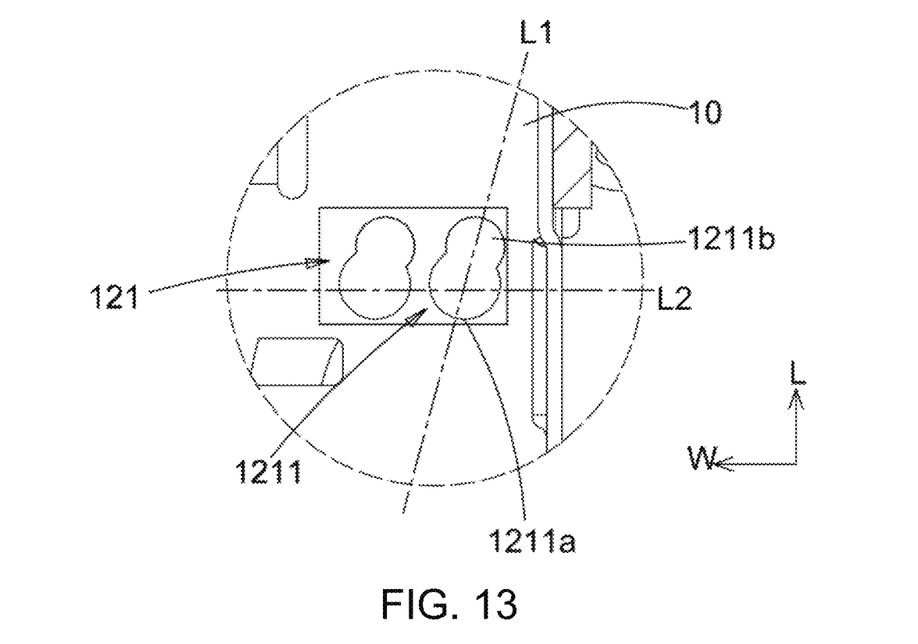
FIG. 13 is a schematic diagram of the first securing component of the fourth embodiment of the present disclosure.
Figure 14:
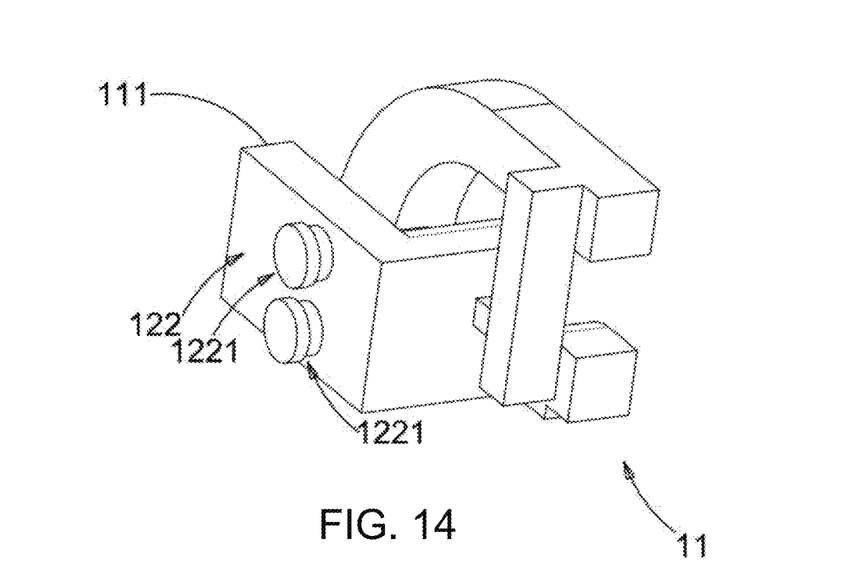
FIG. 14 is a schematic diagram of the second securing component of the fourth embodiment of the present disclosure.

Please refer to FIG. 13 and FIG. 14. FIG. 13 is a schematic diagram of the first securing component of the fourth embodiment of the present disclosure. FIG. 14 is a schematic diagram of the second securing component of the fourth embodiment of the present disclosure. As shown in the figures, the electrical connector 1 of this embodiment is different from that of the first embodiment in that the first securing component 121 of the first embodiment comprises two securing holes 1211, and the direction of the connection between the centers of the two insertion holes 1211a of the two securing holes 1211 is parallel to the length direction of the electrical connector housing 10. In this embodiment, the direction of the line L2 connecting the centers of the two insertion holes 1211a of the two securing holes 1211 is perpendicular to the length direction L of the electrical connector housing 10. This indicates that the two securing holes 1211 are arranged longitudinally along the width direction W of the electrical connector housing 10. In some embodiments, the direction of the line L1 connecting the center of the retaining hole 1211b and the corresponding center of the insertion hole 1211a of each securing hole 1211 may be parallel to, or perpendicular to, or inclined with the length direction L of the electrical connector housing 10. In this embodiment, the direction that the center of the retaining hole 1211b connects to the center of the corresponding insertion hole 1211a is inclined with the longitudinal direction L of the electrical connector housing 10. In this embodiment, the two securing protrusions 1221 of the second securing component 122 and the two securing holes 1211 of the first securing component 121 are disposed correspondingly. Therefore, the two securing protrusions 1221 are also vertically arranged along the width direction of the securing base 111 of the light-guiding component 11. In another embodiment, the direction of the line L2 connecting the center of the two insertion holes 1211a of the two securing holes 1211 can also be inclined with the length direction L of the electrical connector housing 10, and will not be repeated herein.

Figure 15:
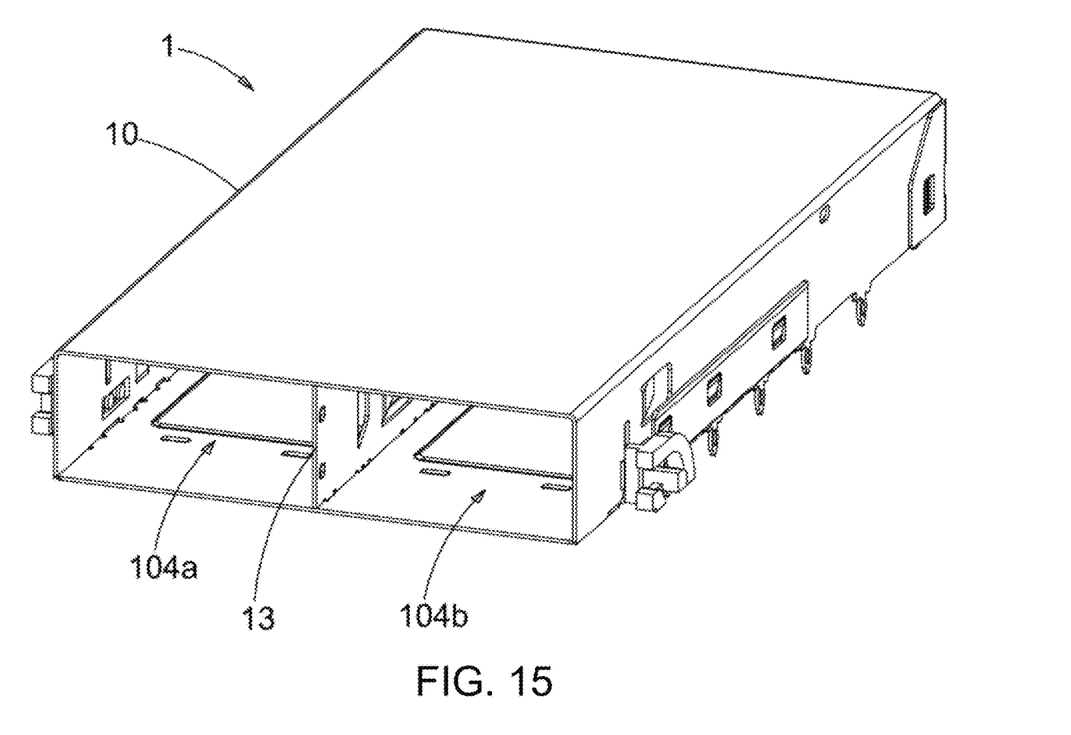
FIG. 15 is a perspective view of an electrical connector of the fifth embodiment of the present disclosure.

Please refer to FIG. 15. FIG. 15 is a perspective view of an electrical connector of the fifth embodiment of the present disclosure. As shown in the figure, the electrical connector 1 of this embodiment is different from that of the foregoing embodiments in that the electrical connector 1 of this embodiment further comprises a partition plate 13 disposed in the electrical connector housing 10. The partition plate 13 is parallel to the sidewalls 102 and separates the space in the electrical connector housing 10 into a plurality of accommodating spaces. In this embodiment, the partition plate 13 divides the accommodating space into a first accommodating space 104a and a second accommodating space 104b. The first accommodating space 104a and the second accommodating space 104b can individually accommodate an electrical connector body. That is the electrical connector 1 of this embodiment comprises two electrical connector bodies. In some embodiments, the number of the partition plates 13 could be multiple to for multiple accommodating spaces, thereby accommodating multiple electrical connector bodies. The partition plate 13 of the electrical connector 1 of this embodiment can be applied to the foregoing embodiments.

Figure 16:
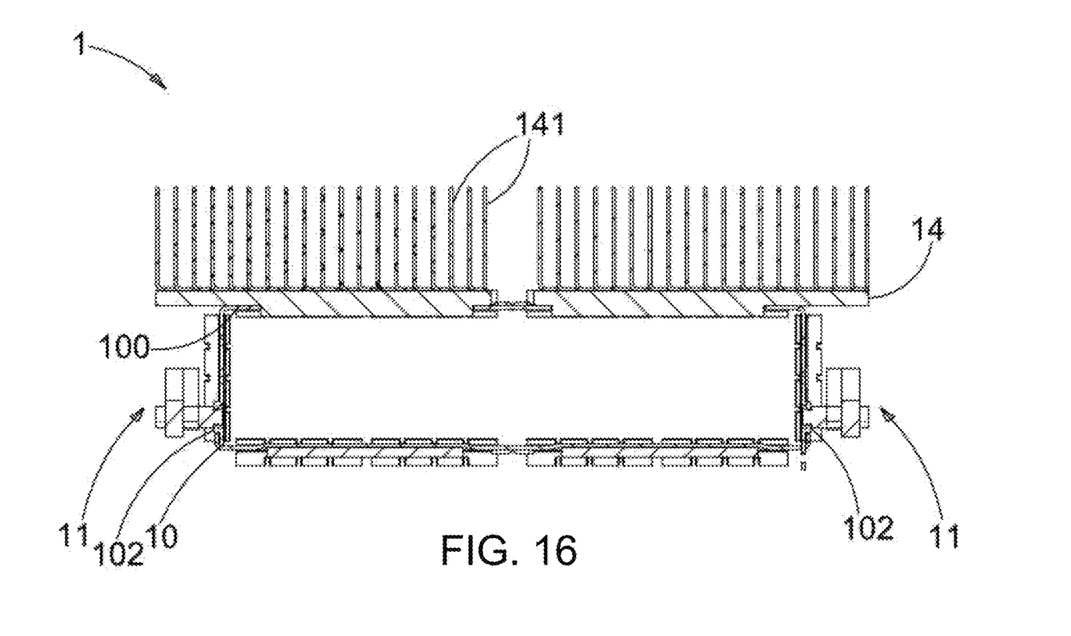
FIG. 16 is a perspective view of an electrical connector of the sixth embodiment of the present disclosure.

Please refer to FIG. 16. FIG. 16 is a perspective view of an electrical connector of the sixth embodiment of the present disclosure. As shown in the figure, the electrical connector 1 of this embodiment is different from that of the foregoing embodiments in that the electrical connector 1 of this embodiment further comprises a heat dissipation component 14 disposed on the upper surface 100 of the electrical connector housing 10. While the electrical connector 1 is in use, the heat dissipation component 14 can conduct the heat generated by the electrical connector body to the outside. The heat dissipation component 14 of this embodiment comprises a plurality of cooling fins 141. The heat dissipation component 14 of this embodiment can be applied to the foregoing embodiments. The light-guiding components 11 of this embodiment are disposed on the sidewalls 102 of the electrical connector housing 10. Thus, the light-guiding component 11 and the heat dissipation component 14 are disposed on different surfaces. The light-guiding component 11 does not interfere with the disposing of the heat dissipation component 14, nor does it interfere with the cooling effect of the electrical connector 1.

In summary, the present disclosure provides an electrical connector, which could stably secure the second securing component onto the first securing component and therefore eliminate the issue of loosening by connecting the first securing component comprising insertion hole and retaining hole and the second securing component comprising first securing part and second securing part to secure the light-guiding component onto the electrical connector housing. It also effectively prevents the light-guiding component from falling off from the electrical connector housing. An interference gap is provided between the insertion hole and the retaining hole. When the first securing part tends to move back from the retaining hole, interference between the sidewalls of the interference gap and the first securing part would effectively prevent the first securing part from being removed from the retaining hole. Moreover, the diameter or width of the retaining hole is less than the maximum outer diameter or maximum width of the second securing part, so that the second securing part does not exit the retaining hole, which avoids the light-guiding component from detaching the electrical connector housing.

It is to be understood that the term "comprises", "comprising", or any other variants thereof, is intended to encompass a non-exclusive inclusion, such that a process, method, article, or device of a series of elements not only include those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:
1. An electrical connector, comprising:
an electrical connector housing having a sidewall;
a light-guiding component disposed on the sidewall of the electrical connector housing; and
a secure-connecting structure disposed between the sidewall of the electrical connector housing and the light-guiding component to secure the light-guiding component to the sidewall of the electrical connector housing,
wherein the secure-connecting structure comprises a first securing component and a second securing component, the first securing component comprises at least one securing hole, the securing hole comprises an insertion hole and a retaining hole, the insertion hole is in communication with the retaining hole, the second securing component comprises a securing protrusion, the securing protrusion comprises a first securing part and a second securing part disposed on the first securing part, and when the second securing component is disposed into the first securing component, the second securing part first passes through the insertion hole and then the first securing part moves into the retaining hole from the insertion hole.

2. The electrical connector according to claim 1, wherein the diameter or width of the insertion hole is greater than the diameter or width of the retaining hole.

3. The electrical connector according to claim 1, wherein the maximum outer diameter or the maximum width of the first securing part is less than the maximum outer diameter or the maximum width of the second securing part.

4. The electrical connector according to claim 1, wherein the maximum outer diameter or the maximum width of the second securing part is less than the diameter or width of the insertion hole, and the maximum outer diameter or the maximum width of the second securing part is greater than the diameter or width of the retaining hole.

5. The electrical connector according to claim 1, wherein the maximum outer diameter or the maximum width of the first securing part is less than or equal to the diameter or the width of the retaining hole.

6. The electrical connector according to claim 5, wherein the maximum outer diameter or the maximum width of the first securing part is equal to the diameter or the width of the retaining hole, and the first securing part is secured within the retaining hole by an interference fit.

7. The electrical connector according to claim 1, wherein an interference gap exists between the insertion hole and the retaining hole, and the width of the interference gap is less than or equal to the maximum outer diameter or the maximum width of the first securing part.

8. The electrical connector according to claim 1, wherein the insertion hole partially overlaps with the retaining hole so that the insertion hole is in communication with the retaining hole.

9. The electrical connector according to claim 1, wherein the securing hole further comprises a communication hole, one end of the communication hole connects to the insertion hole, the other end of the communication hole connects to the retaining hole, and the insertion hole is in communication with the retaining hole through the communication hole.

10. The electrical connector according to claim 1, wherein the direction that the center of the insertion hole connects to the center of the retaining hole is parallel to, or perpendicular to, or inclined with the direction of the length of the electrical connector housing.

11. The electrical connector according to claim 1, wherein the number of the at least one securing hole is more than one, and the direction of the connection between the centers of the insertion holes of the securing holes is parallel to, or perpendicular to, or inclined with the direction of the length of the electrical connector housing.

12. The electrical connector according to claim 1, wherein the insertion hole and the retaining hole are circular, and the first securing part and the second securing part are cylindrical.

13. The electrical connector according to claim 1, wherein the first securing component is disposed on the sidewall of the electrical connector housing, the second securing component is disposed on the light-guiding component, the first securing part is disposed on the surface of the light-guiding component facing the electrical connector housing, and the second securing part is away from the light-guiding component.

14. The electrical connector according to claim 13, wherein a recess is provided on the sidewall of the electrical connector housing, the first securing component is disposed at the bottom of the recess, and the second securing component is in the recess while the second securing component is disposed into the first securing component.

15. The electrical connector according to claim 1, wherein the first securing component is disposed on the light-guiding component, and the second securing component is disposed on the sidewall of the electrical connector housing.

16. The electrical connector according to claim 1, wherein the light-guiding component comprises a securing base and a light-guiding tube disposed on the securing base, the light-guiding tube comprises a light input end and a light output end, the end surface of the light output end is on one side of a first opening of the electrical connector housing, and the end surface of the light input end is close to the surface of the electrical connector housing comprising a second opening.

17. The electrical connector according to claim 1, further comprising: a partition plate disposed in the electrical connector housing, wherein the partition plate is parallel to the sidewall, and the partition plate divides the space in the electrical connector housing into a plurality of accommodating spaces.

18. The electrical connector according to claim 1, further comprising: a heat dissipation component disposed on the upper surface of the electrical connector housing.

* * * * *